United States Patent [19]

Krehel et al.

[11] Patent Number: 4,524,617
[45] Date of Patent: Jun. 25, 1985

[54] FUEL GAUGE FOR PROPANE TANK

[75] Inventors: Charles A. Krehel, Trumbull; George N. Kaniwec, Southington, both of Conn.

[73] Assignee: The Cooper Thermometer Company, Middlefield, Conn.

[21] Appl. No.: 539,475

[22] Filed: Oct. 6, 1983

[51] Int. Cl.³ .................. A47J 37/08; G01F 23/20
[52] U.S. Cl. ......................... 73/296; 126/41 R; 177/245
[58] Field of Search ............... 73/296; 177/245, 225, 177/173, 256; 126/41 R

[56] References Cited

U.S. PATENT DOCUMENTS

| 3,047,084 | 7/1962 | Vogel | 177/299 |
| 3,891,040 | 6/1975 | Schmitter | 177/173 X |
| 3,894,591 | 7/1975 | Ackeret | 177/245 X |
| 4,082,154 | 4/1978 | Pillote | 177/225 |
| 4,245,505 | 1/1981 | Baynes | 177/245 X |

FOREIGN PATENT DOCUMENTS 56-16819 2/1981 Japan ......................... 73/296

Primary Examiner—Daniel M. Yasich
Attorney, Agent, or Firm—Prutzman, Kalb, Chilton & Alix

[57] ABSTRACT

A fuel gauge for indicating the level of fuel in a liquid propane tank comprises a housing mounting a weighing means and a cover forming a weighing platform. A locator means secures the tank on the weighing platform. An indicator means indicates the level of fuel in the tank in response to the actuation of the weighing means. The indicator means includes a scale and an angularly alignable pointer.

9 Claims, 5 Drawing Figures

FUEL GAUGE FOR PROPANE TANK

BACKGROUND OF THE INVENTION

This invention relates to a fuel gauge for determining the quantity of fuel in a liquid propane gas tank. More particularly, this invention relates to a fuel gauge adaptable for use in a recreational-type gas grill employing a liquid propane gas tank for determining the fuel level of the liquid propane gas tank.

Gas grills employing a liquid propane gas tank fuel supply have become increasingly popular. Such popularity is due in part to the relative portability of such grills, the relatively low fuel consumption of the grills and the desirable cooking characteristics of gas. One of the few problems that has been encountered by the many users of gas grills employing a liquid propane tank fuel supply has been that of accurately determining the propane fuel supply so that a new fuel supply my be secured before the fuel is exhausted or the fuel does not run out unexpectedly.

A number of devices have been disclosed which are directed to measuring or indicating the fuel level in a tank of a type such as a conventional twenty-pound liquid propane tank commonly employed with gas grills. Some of the prior art tank fuel level indicator devices employ a weighing means in one form or another to provide an indication of the fuel level of a tank. For example, U.S. Pat. Nos.: 4,245,505, 2,015,689, and 1,818,001 employ means for determining the level in a tank through an intermediate step of determining the weight of the tank and the fuel. In U.S. Pat. No. 4,063,605 a linear indicator is mounted to a tank to show a vertical position of the tank relative to a mounting frame wherein the liquid level within the tank may be ascertained. The present invention is directed to a fuel gauge for a propane tank of relatively simple and inexpensive construction which is easily adaptable for use in conjunction with a propane tank of a conventional recreational gas grill.

BRIEF SUMMARY OF THE INVENTION

Briefly stated, the invention in a preferred form is a fuel gauge for determining the quantity of fuel in a liquid propane gas tank. The fuel gauge comprises a housing mounting a spring actuated weighing means. The housing also mounts a cover which forms a generally horizontal weighing platform. A locator means is employed to locate and secure a tank on the weighing platform. An indicator means indicates the fuel level of a liquid propane tank in response to the weight of a tank which is received on the weighing platform. The indicator means includes a circumferentially extending scale having graduations indicative of various tank fuel levels. The scale is affixed to a substantially transparent angularly inclined overhang structure extending from a peripheral portion of the cover. A pointer which is angularly alignable with the graduations is visible through the overhang structure to indicate the quantity of fuel in the propane fuel tank received and secured to the weighing platform. The locator means comprises a circular rim which projects upwardly from the weighing platform. A plurality of angularly spaced retention screws are threaded into the rim and adapted to engage the base of a propane tank.

An object of the invention is to provide a new and improved fuel gauge for measuring the quantity of fuel in a liquid propane gas tank.

Another object of the invention is to provide a new and improved fuel gauge of rugged heavy-duty construction which is relatively easy to employ for use in a conventional gas grill.

Another object of the invention is to provide a new and improved fuel gauge for accurately and reliably indicating the fuel level of a liquid propane gas tank wherein the indicator has an efficient mechanical construction which is relatively inexpensive to manufacture.

Other objects and advantages of the invention will become apparent from the drawings and detailed description.

DETAILED DESCRIPTION

Figures 1, 2:
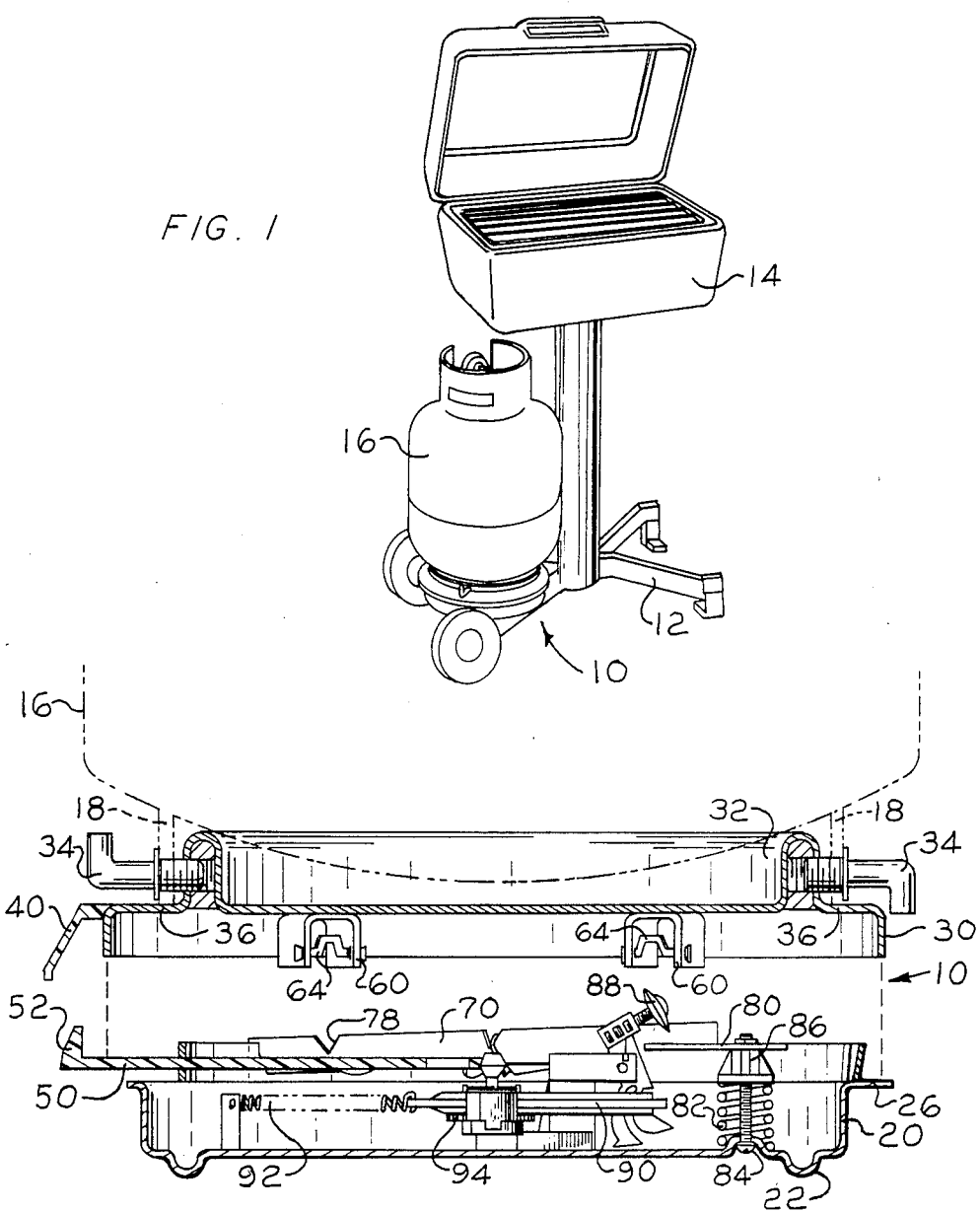
FIG. 1 is a perspective view of a fuel gauge of the present invention illustrated in its preferred application relative to a recreational type gas grill employing a liquid propane tank fuel supply.
FIG. 2 is a side-sectional view of the fuel gauge of FIG. 1 partially exploded with portions of a propane fuel tank being illustrated in phantom.

With reference to the drawings wherein like numerals represent like parts throughout the several drawings, a fuel gauge of the present invention is generally designated by the numeral 10. With reference to FIG. 1, fuel gauge 10 is adapted for use in indicating the level of fuel in a propane tank employed in connection with a recreational type gas grill. Fuel gauge 10 is mounted to the base 12 of gas grill 14. A twenty-pound propane fuel tank 16 of conventional form is mounted to the top of fuel gauge 10. The indicating portion of the fuel gauge is visible at an exterior peripheral portion of the fuel gauge as more clearly shwon in FIGS. 3 and 4.

Figure 3:
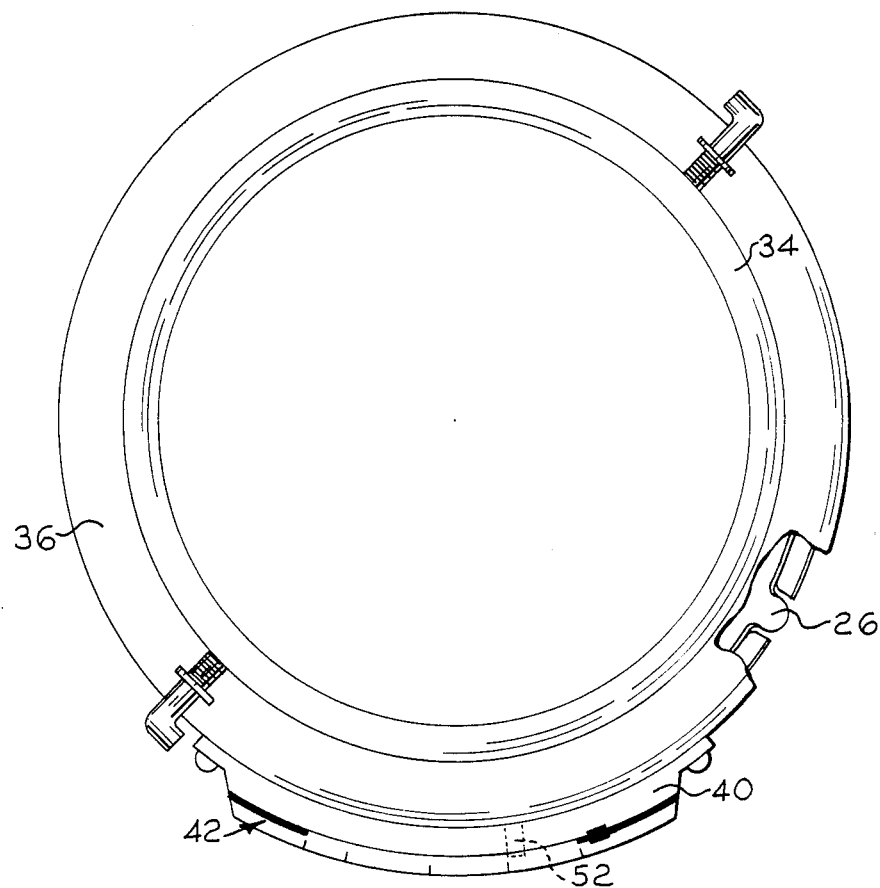
FIG. 3 is a top view of the fuel gauge of FIG. 1, partially broken away to show detail.
Figure 4:
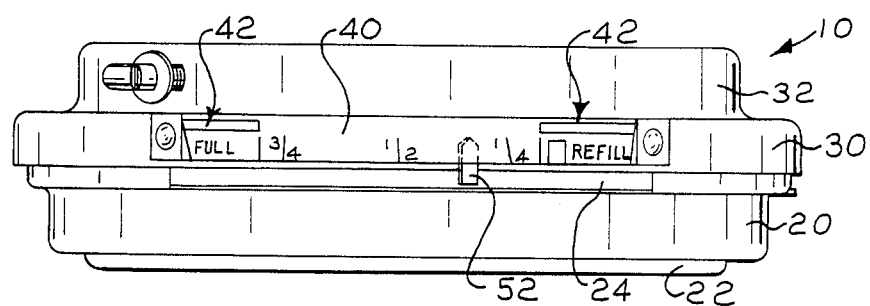
FIG. 4 is a front view of the fuel gauge of FIG. 1.

With further reference to FIG. 2, FIG. 3, and FIG. 4, fuel gauge 10 may be exteriorly description as having a substantially stepped cylindrical form of pleasing appearance with the height of the fuel gauge being substantially less than the diameter. Fuel gauge 10 comprises a lower housing 20 having a lowerly disposed circular supporting rim 22. A cover 30 integrally forming an upwardly projecting circular locator rim 32 is mounted at the top of housing 20 in a manner wherein lower peripheral portions of cover 30 enclose a top portion of housing 20. Housing 20 is further provided with three peripherally extending tabs 26 which abut against a lower edge of the cover 30. The cover 30 is secured to housing 20 by a pair of bolts and lock nuts (not illustrated) secured through an opening 28 (illustrated in FIG. 5).

A substantially transparent angularly inclined skirt or overhang structure 40 affixed with various circumferentially extending fuel level indicia designated generally as 42 extend outwardly from a front peripheral portion of cover 30. Housing 20 has a peripheral circumferentially extending slot 24 from which projects a radially extending indicator arm 50 terminating with a pointer 52. Pointer 52 is angularly alignable with the fuel level indicia 42 and is located interiorly of transparent skirt 40 so as to be exteriorly visible for indicating the fuel level of a propane fuel tank. The pointer 52 and the indicia 42 are outwardly positioned so that the fuel level may be readily ascertained from an overhead and/or a side viewing position.

Locator rim 32 is adapted to accommodate the reception of propane tank 16 at the top of cover 30. Conventionally, propane tank 16 is provided with a mounting rim 18 having slots for securing the tank in place. A pair of retention screws 34 received in the slots of the tank mounting rim are threaded into locator rim 32 and tightened against the mounting rim to firmly secure the propane tank in place and to symmetrically locate the propane tank relative to cover 30. In a preferred form, the diameter of locator rim 32 is approximately 7 and 5/16 inches. Cover 30 forms at its upper surface a weighing platform 36 which cooperates with a weighing mechanism mounted within housing 20 to essentially provide a fuel level indicator means which is actuable in response to the weight of a fuel tank suitably mounted to the cover of the fuel gauge. A wide variety of weighing mechanisms may be provided to accomplish the objective of employing a radial indicator arm to indicate of the weight of the fuel tank. For purposes of illustration, a preferred weighing mechanism which is suitable for incorporation into the present invention is described below.

Figure 5:
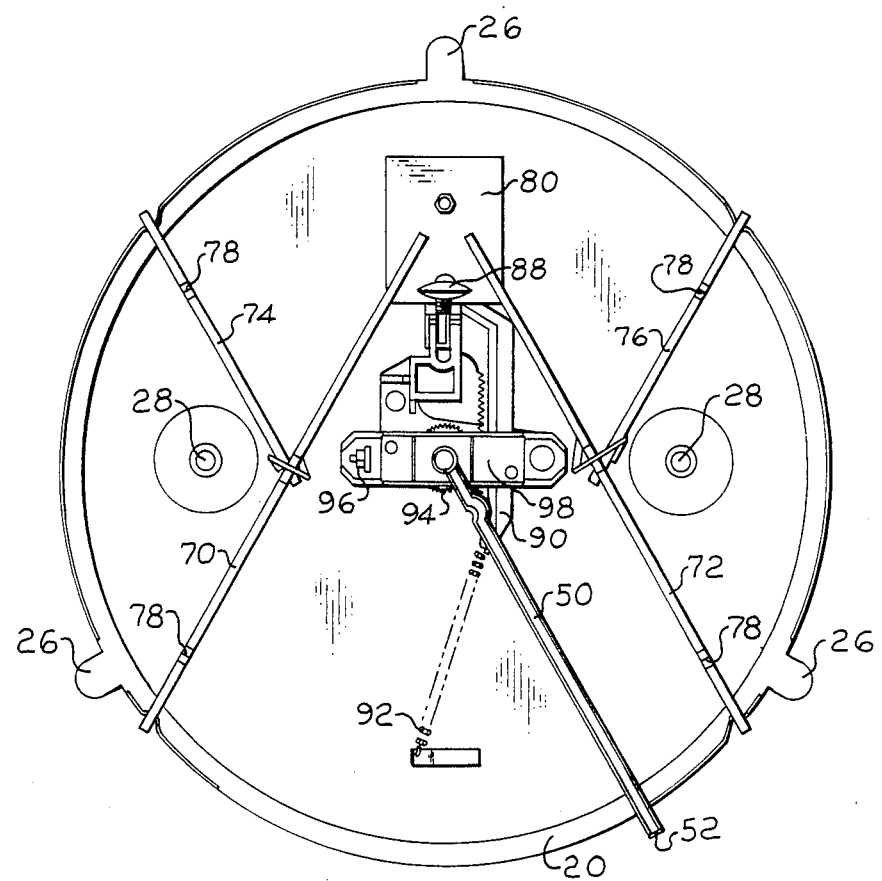
FIG. 5 is a top view of the fuel gauge of FIG. 1, the top portion thereof being removed.

With further reference to FIG. 2, FIG. 3, and FIG. 5, four U-shaped brackets 60 (only two being illustrated) are mounted on the underside of cover 30. Pivoting retainer clips 64 are pivotally mounted through the sides of the brackets. Elongated lever arms 70 and 72 each rest at one end of a portion of the housing 20 and rest at the opposite end on a deflector plate 80. Lever arms 74 and 76 each rest at one end on a portion of housing 20 and are joined at the other end to intermediate portions of lever arms 70 and 72, respectively. Each of lever arms 70, 72, 74 and 76 have V-shaped slots 78 which receive a corresponding retainer clip 64 connected to the underside of the cover. It will be appreciated that when cover 30 is mounted to housing 20, and a tank 16 is positioned on the cover weighing platform 36 as previously described, the weight of propane tank 16 will be transferred through retainer clips 64 and the lever arms to deflector plate 80.

Deflector plate 80 is supported by a spring 82 which is coiled around a bolt 84. Bolt 84 receives an intermediate flared retainer member 86 and is secured by a nut to a central portion of deflector plate 80. The resultant force of the weight of the tank transmitted through the four lever arms 70, 72, 74 and 76 results in a deflection of spring 82 and plate 80 causing pivot lever 88 to rotate about its axis. The rotation of pivot lever 88 moves geared segment 90 in a linear motion. Geared segment 90 is preloaded by a tension spring 92. The linear motion of geared segment 90 is transmitted to pinion gear 94 resulting in the rotation of pinion gear 94. Indicator arm 50 is connected to the shaft of pinion gear 94 and rotates to an equilibrium position which is proportional to the applied force or the weight of the propane tank.

The pointer 52 at the end of indicator arm 50 is exteriorly visible through the transparent skirt 40 which is fixed with fuel level indicia so that the alignment of the pointer with the indicia scale will indicate the fuel level of the tank. In a preferred embodiment as illustrated in FIG. 4, the indicia scale has indicia 42 indicating a full tank zone, a three-quarters tank zone, a one-half tank zone, a one-quarter tank zone, and a refill zone. The scale may be preadjusted to a dot within the refil zone by mounting an empty tank (conventionally on the order of approximately 18.5 lbs.) on the weighing platform. Such an adjustment will provide an allowance for approximately 1.5 lbs. Of reserve at the beginning of the refill zone. The adjustment also compensates for variations in the weight of empty fuel tanks. The adjustment may be accomplished by loosening a lock screw 96 which is recessed in the bottom of housing 20. A pivot plate 98 may then be moved in either direction and retightened in place by securing lock screw 96.

The foregoing described fuel gauge has been set forth for purposes of illustration and should not be deemed a limitation of the present invention. Accordingly, various modifications, adaptations, and alternatives may occur to one skilled in the art without departing from the spirit and scope of the present invention.

What is claimed is:

1. A fuel gauge for indicating the level of fuel in a liquid propane-type fuel tank comprising:
    a base mounting a weighing means to measure the weight of an object including an angularly positionable indicator, the angular position of which indicator is indicative of weight;
    a cover mounted to said base and forming a weighing platform for said weighing means, said base and cover cooperating to form a housing means to generally enclose said weighing means;
    locator means to locate and secure a propane-type fuel tank on said weighing platform;
    indicia means at the exterior periphery of said housing means forming a circumferentially extending scale, said indicator being angularly alignable with pre-established positions of said scale so that the level of fuel in a propane tank mounted on said weighing platform is indicated by the position of said indicator relative to said scale.

2. The fuel gauge of claim 1 wherein the locator means comprises a circular rim projecting generally orthogonally relative to said weighing platform.

3. The fuel gauge of claim 2 wherein the locator means further comprises a plurality of angularly spaced retention screws threaded into said rim.

4. The fuel gauge of claim 3 wherein the rim has an outer diameter of approximately 7 and 5/16 inches.

5. The fuel gauge of claim 1 wherein the scale is affixed to a substantially transparent angularly inclined overhang structure extending from a peripheral portion of the cover.

6. The fuel gauge of claim 5 wherein the housing means forms a circumferentially extending slot and the indicator comprises an arm terminating in a pointer, said arm extending through said slot so that the pointer is visible through said transparent overhang structure.

7. The fuel gauge of claim 1 wherein said indicia means further includes indicia designating a full zone, a refill zone and fractional level graduations between said zones.

8. A fuel gauge for indicating the level of fuel in a liquid propane-type fuel tank comprising:
    a base mounting a weighing means to measure the weight of an object including an angularly positionable indicator arm, the angular position of which arm is indicative of weight;
    a cover generally concentrically mounted to said base and forming a weighing platform for said weighing means, said base and cover cooperating to form a generally cylindrically-shaped housing means to generally enclose said weighing means, said housing means forming a circumferentially extending slot;

a locator rim to locate a propane-type fuel tank on said weighing platform;

a fastener means connecting said locator rim to secure a propane-type fuel tank on said weighing platform; and indicia means the exterior side of said housing means in generally forming a circumferentially extending scale at an inclined angle thereto, said indicator arm extending through said slot and being angularly alignable with pre-established positions of said scale so that the level of fuel in a propane tank mounted on said weighing platform is indicated by the position of said indicator arm relative to said scale.

9. The fuel gauge of claim 8 further comprising a transparent overhang structure extending from said cover, said indicia means being affixed to said overhang structure.

* * * * *